United States Patent

Miyai

[15] 3,698,190
[45] Oct. 17, 1972

[54] TANDEM MASTER CYLINDER
[72] Inventor: Masaya Miyai, Toyota, Japan
[73] Assignee: Aisin Seiki Kabushiki Kaisha, Kariya, Aichi Pref., Japan
[22] Filed: March 15, 1971
[21] Appl. No.: 124,258

[30] Foreign Application Priority Data

March 25, 1970 Japan..................45/24624

[52] U.S. Cl.............60/54.6 E, 60/54.6 R, 60/54.6 S
[51] Int. Cl................................F15b 7/00
[58] Field of Search..........60/54.5 E, 54.6 E, 54.6 R, 60/54.5 S, 54.6 S

[56] References Cited

UNITED STATES PATENTS 3,478,517   11/1969   Shellhause..............60/54.6 E

*Primary Examiner*—Edgar W. Geoghegan
*Assistant Examiner*—A. M. Zupcic
*Attorney*—Pierce, Scheffler & Parker

[57] ABSTRACT

A tandem master cylinder for the brake systems of the vehicle has a primary piston operable mechanically by a brake pedal and a secondary piston operable by hydraulic pressure generated by the primary piston. At least one of the primary and secondary pistons comprises a fluid storage chamber to normally store the brake fluid therein, a fluid locking piston urged to move within the storage chamber by the other piston or end wall of the cylinder, and a valve means for controlling fluid communication to the storage chamber in response to brake fluid pressure. When no hydraulic pressure is generated in one of the brake systems associated with the storage chamber, the locking piston and the valve means will cooperate to lock the fluid in the storage chamber thereby minimizing brake pedal travel loss.

16 Claims, 4 Drawing Figures

TANDEM MASTER CYLINDER

This invention relates to a master cylinder construction and more particularly to a tandem master cylinder having distict fluid systems associated with the front wheel brakes and the rear wheel brakes in which in the event of hydraulic failure of one fluid system, the other will function.

The tandem master cylinder in which there are provided two pressurizing pistons one of which is mechanically actuated by a brake pedal while the other is actuated by fluid pressure generated by the one piston is called as float-piston type master cylinder. The conventional float-piston type master cylinders tend to increase pedal travel loss for applying the brake upon the hydraulic failure. This is very dangerous to the vehicle operator.

Accordingly, it is a principal object of the present invention to provide a tandem master cylinder of the float-piston type in which the brake pedal travel loss is kept to a minimum in the event of pressure filure.

Other objects will be apparent from the following description with reference to the accompanying drawings which depict several embodiments of the invention for illustrative purposes only.

Figure 1:
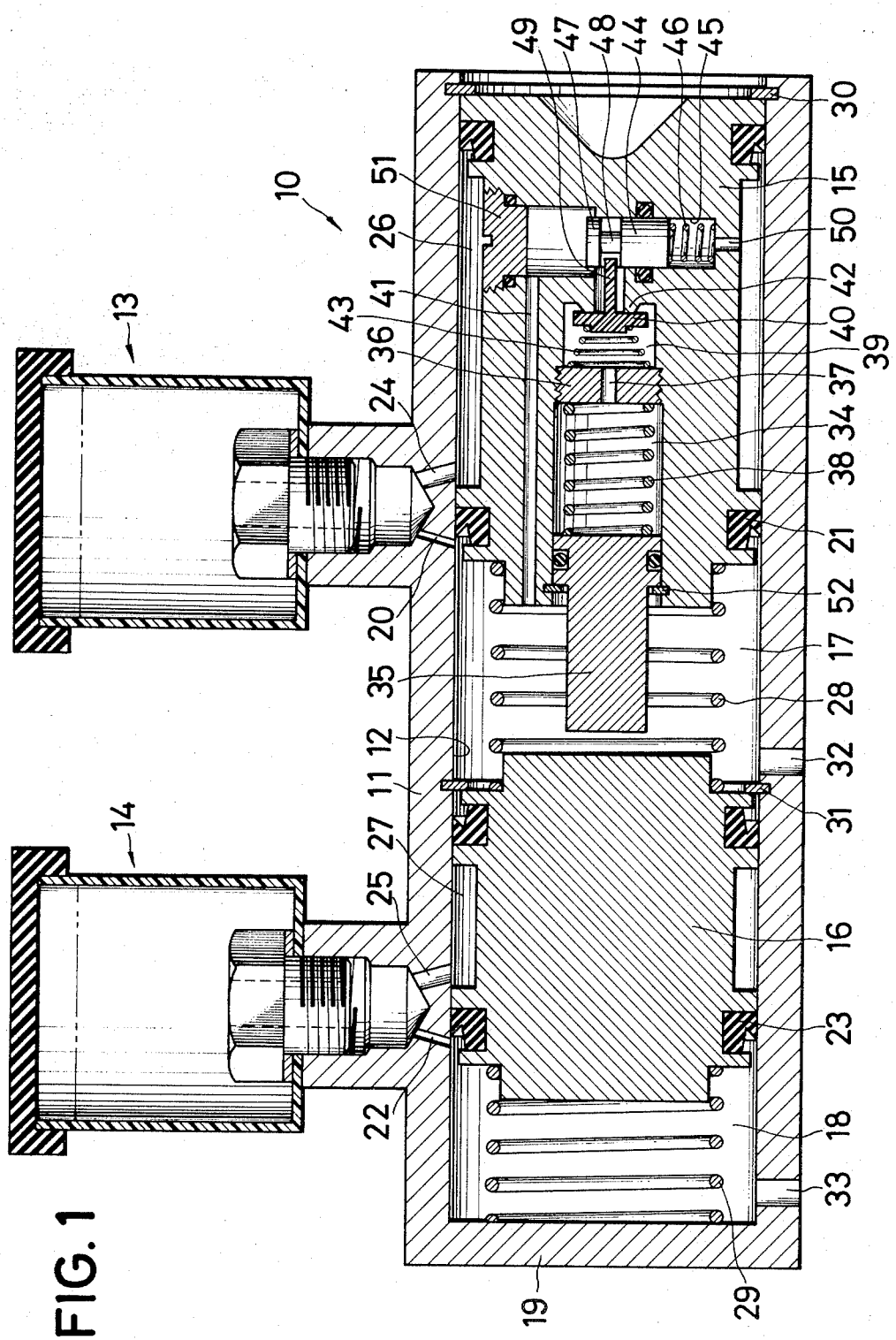
FIG. 1 is a section view of the tandem master cylinder embodying the invention positioned in its brake releasing position.

Referring first to FIG. 1, a brake master cylinder assembly 10 includes a cylinder housing 11 and a cylinder bore 12, said cylinder housing 11 being provided with a primary oil reservoir 13 and a secondary oil reservoir 14 independent to each other. Within the bore 12, there are slidingly and sealingly fitted a primary piston 15 mechanically connected to a brake pedal (not shown) through a push rod (not shown) in the conventional manner and a secondary piston 16. The cylinder bore 12 includes a primary fluid chamber 17 defined by the primary and secondary pistons 15 and 16 and a secondary fluid chamber 18 defined by the secondary piston 16 and a forward end wall 19 of the cylinder housing 11.

The cylinder housing 11 is provided with a compensating port 20 to be closed by a suitable seal 21 of the primary piston 15 when the primary piston 15 is moved forward (in the left direction in FIG. 1) thereby interrupting fluid communication between the primary oil reservoir 13 and the primary fluid chamber 17, thus causing hydraulic fluid in the primary chamber 17 to be pressurized. Similarly, a compensating port 22 is provided on the cylinder housing 11 to be closed by a suitable seal 23 of the secondary piston 16 when the second piston 16 is moved forward due to the pressurized fluid in the primary chamber 17 thereby interrupting fluid communication between the secondary oil reservoir 14 and the secondary chamber 18, thus causing hydraulic fluid in the secondary chamber 18 to be pressurized.

The cylinder housing 11 is further provided with oil supplying ports 24 and 25 for a ring space 26 of the primary piston 15 and a ring space 27 of the secondary piston 16, respectively.

Compression coiled springs 28 and 29 are positioned in the primary chamber 17 and in the second chamber 18 respectively and act against each piston to urge it rearward i.e. to the right in FIG. 1. Piston stopper rings 30 and 31 are securely fitted on the cylinder housing 11 for limiting original starting positions of the two pistons 15 and 16, respectively. Thence, each piston is retained in the position shown in FIG. 1 when no brake force is applied thereto, so that each fulid chamber is connected to the oil reservoir through the compensating port. Outlet ports 32 and 33 are provided on the cylinder housing 11 to fluidically communicate the primary and secondary chambers 17 and 18 with rear wheel brakes (not shown) and front wheel brakes (not shown), respectively. To the extent that the master cylinder assembly 10 has been so far described, it is a conventional tandem master cylinder of the type commonly used in automotive vehicle at this time.

The tandem master cylinder of this invention will now be described. The primary piston 15 comprises coaxially a fluid storage chamber 34 within which a locking piston 35 is slidingly and sealingly fitted and a plug 36 provided with a central aperture 37 is seated. A compression coil spring 38 is mounted between the locking piston 35 and the plug 36 thereby urging the locking piston to move in its forward direction, the forward movement of the locking piston 35 being limited by a stop ring 52 secured on the primary piston. The fluid storage chamber 34 comprises a valve chamber 39 which is defined by the plug 36 and a valve member 40 and fluidically communicated with the primary chamber 17 via a fluid passageway 41 of the primary piston 15 by control of the valve member 40, said valve member being housed in the valve chamber 39 and seated against a valve seat 42 of the primary piston 15 by a return spring 43.

A vertically reciprocable pilot piston 44 is sealingly fitted in a vertical bore 45 of the primary piston 15 in which a coil spring 46 is mounted for normally biasing the pilot piston 44 in the upward direction, said pilot piston 44 comprising a head 47 and a reduced area neck 48. A stem 49 of the valve member 40 projects toward the reduced area neck 48 and is engaged with the head 47 upon downward travel of the pilot piston 44. There is provided a hole 50 in the primary piston 15 which will communicate the bore 45 with the ring space 26 and then with the primary oil reservoir 13 so that the pilot piston 44 is at its bottom side normally applied with the atmospheric pressure through the hole 50. A plug 51 is fitted in the primary piston 15 after the pilot piston 44 is assembled therein.

It should be noted that the exerting force of the spring 38 is set so strong that the locking piston 35 will not move thereagainst when the hydraulic pressure, generated in the primary chamber, is insufficient to actuate the pilot piston 44. In addition, the axial gap is provided between the back wall of secondary piston 16 and the forward end of locking piston 35 in the brake releasing position as is shown in FIG. 1 thereby preventing the locking piston 35 from making contact with the secondary piston 16 before actuation of the pilot piston 44.

In normal brake operation, when the brake pedal is depressed to move the primary piston 15 in the left direction (FIG. 1), the primary fluid chamber 17 is hermetically sealed by the sealing member 21 to pressurize the fluid therein whereby the secondary fluid chamber 18 is hermetically sealed by the sealing member 23 to pressurize the fluid therein. Thus the hydraulic pressure in the front and rear wheel brakes will be generated. At this time, the pilot piston 44 is traveled downward by the pressurized fluid in the primary chamber 17 against exerting force of the spring 46. Thus the stem portion 49 of the valve member 40 is inclined by the head 47 of the pilot piston 44 thereby permitting fluid communication between the primary chamber 17 and the storage chamber 34 through the fluid passageway 41. The pressurized fluid is therefore admitted in the storage chamber 34 during brake operation to slide forwardly the locking piston 35 which most forward position is defined by the stopper ring 52.

It is to be noted that upon brake application the locking piston 35 is movable to the right by the secondary piston 16 thereby pressurizing fluid in the storage chamber 34, the primary chamber 17, and then the rear wheel brakes, so that the hydraulic lock of the primary piston 15 and the locking piston 35 will be avoided before there has been sufficient generation of hydraulic pressure.

If, however, there is no pressure generated in the primary chamber 17 for any reason during the pressurizing movement of primary piston 15, the pilot piston 44 will not be urged to downward travel. Thus, the valve member 40 is not opened. A further forward movement of the primary piston 15 permits the locking piston 35 to make contact with the secondary piston 16 so that the locking piston 35 is urged to move rearward thereby locking brake fluid in the storage chamber 34. Thus the only brake pedal travel loss is that which will move the locking piston 35 from the secondary piston contact position to the brake fluid locking position, after which the locking piston 35 will not be moved relative to the primary piston 15, and pressurizing force of the brake pedal is delivered mechanically to the secondary piston 16, thereby pressurizing brake fluid in the secondary chamber 18.

Figure 2:
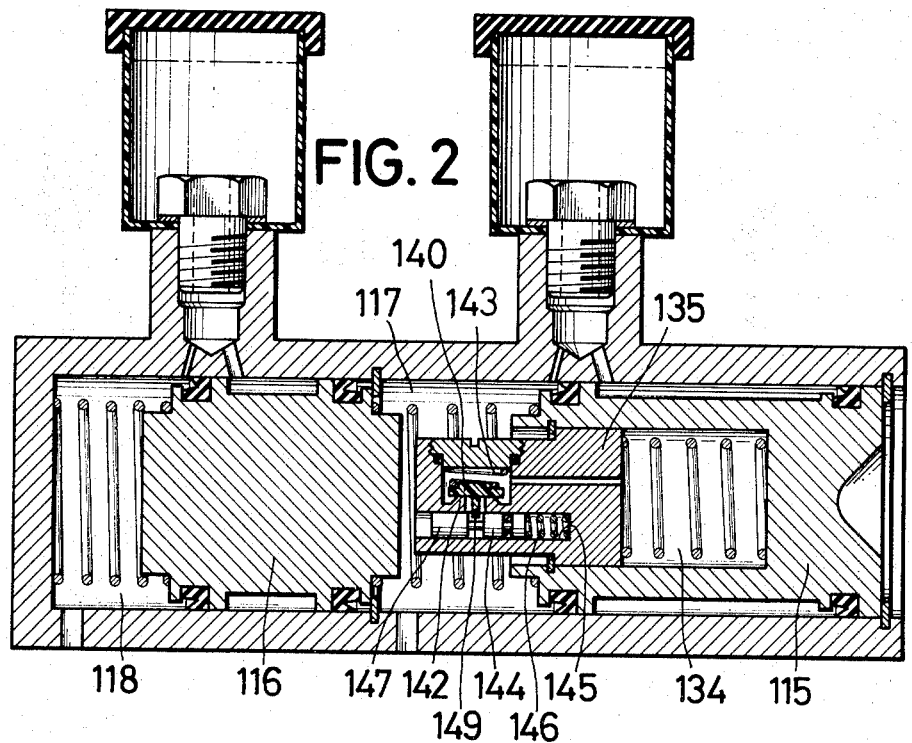
FIG. 2 is a view similar to FIG. 1 showing a first modification.

A first modification of the invention is illustrated in FIG. 2 in which a locking piston 135 comprises a transverse bore 145, a pilot piston 144 slidingly and sealingly fitted in the transverse bore 145, and a valve member 140 cooperable with the pilot piston 144. A coiled spring 146 is positioned in the transverse bore 145 in which present atmospheric air is also normally. A fluid storage chamber 134 is defined by the inner wall of a primary piston 115 and the valve member 140 normally urged to seat against a valve seat 142 by a coil spring 143. The valve member 140 comprises a projection 149 which will be engaged with a head 147 of the pilot piston 144 thereby permitting fluid communication between a primary chamber 117 and the storage chamber 134 upon pressurizing of brake fluid in the primary chamber 117.

In normal brake operation, the pilot piston 144 is moved to the right, compressing the return spring 146 and air in the transverse bore 145, whereby the valve member 140 is inclined to permit pressurized fluid to enter the storage chamber 134. In the event of hydraulic failure of the brake system including the primary chamber 134, after the locking piston 135 has been made contact with a secondary piston 116 to lock fluid in the storage chamber 134, the locking piston 135 is no longer moved with respect to the primary piston 115 so that pressurizing force is delivered mechanically to the secondary piston 116 from the locking piston 135 in unison with the primary piston 115. Thus the hydraulic pressure is generated in a secondary chamber 118.

Although in the foregoing two embodiments the hydraulic failure of the secondary chamber can not be compensated for, when it is desired to compensate for failure of either one of the primary and secondary fluid chambers, the fluid storage chamber to be locked may be provided with respect to each piston as will be apparent from the following embodiments.

Figure 3:
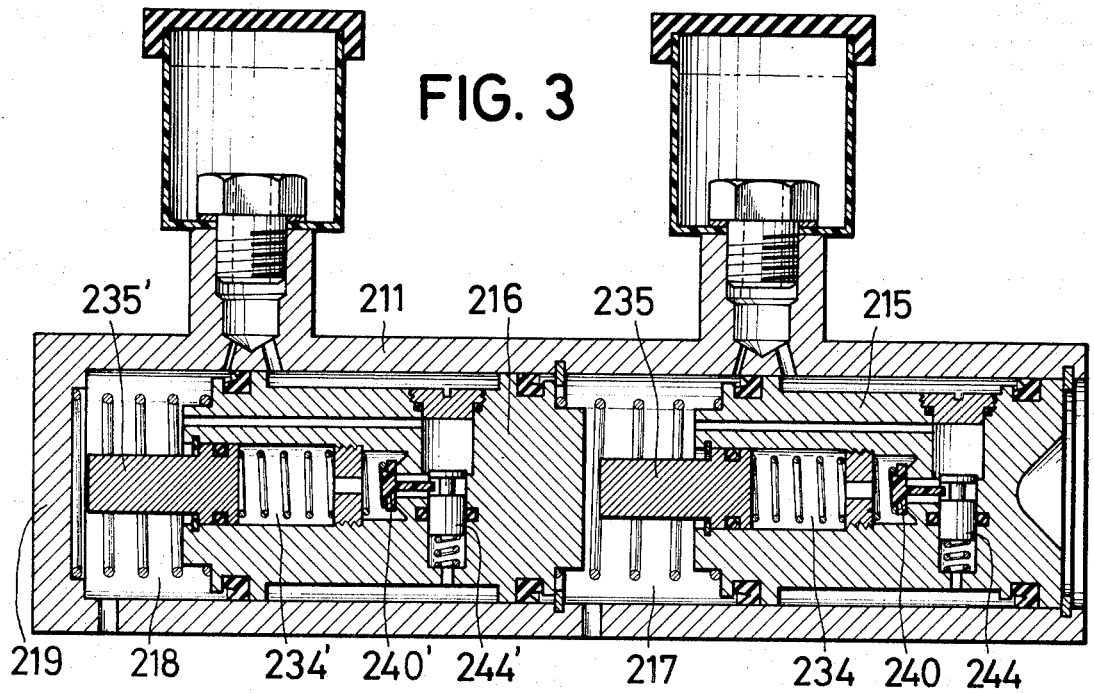
FIG. 3 is a view similar to FIG. 1 showing a second modification.

A second modified form of the invention is shown in FIG. 3 in which a locking piston 235' is also mounted on a secondary piston 216 as well as a locking piston 235 on a primary piston 215. Arrangement of locking pistons 235 and 235', valve members 240 and 240', pilot pistons 244 and 244', and fluid storage chambers 234 and 234' are substantially the same as in the first embodiment shown in FIG. 1 so that the detailed explanation will be omitted. However, it is to be noted that in case no hydraulic pressure is generated in a secondary chamber 218, the secondary piston 216 is forwarded together with the locking piston 235' until the locking piston 235' is made contact with a forward end wall 219 of the cylinder housing 211. Then the locking piston 235' will be slightly moved rearward (to the right in FIG. 3) thereby locking fluid in the storage chamber 234', after which the second piston 216 is not moved relative to the cylinder housing 211 so that there is very little brake pedal loss before brake fluid in a primary chamber 217 is pressurized.

Figure 4:
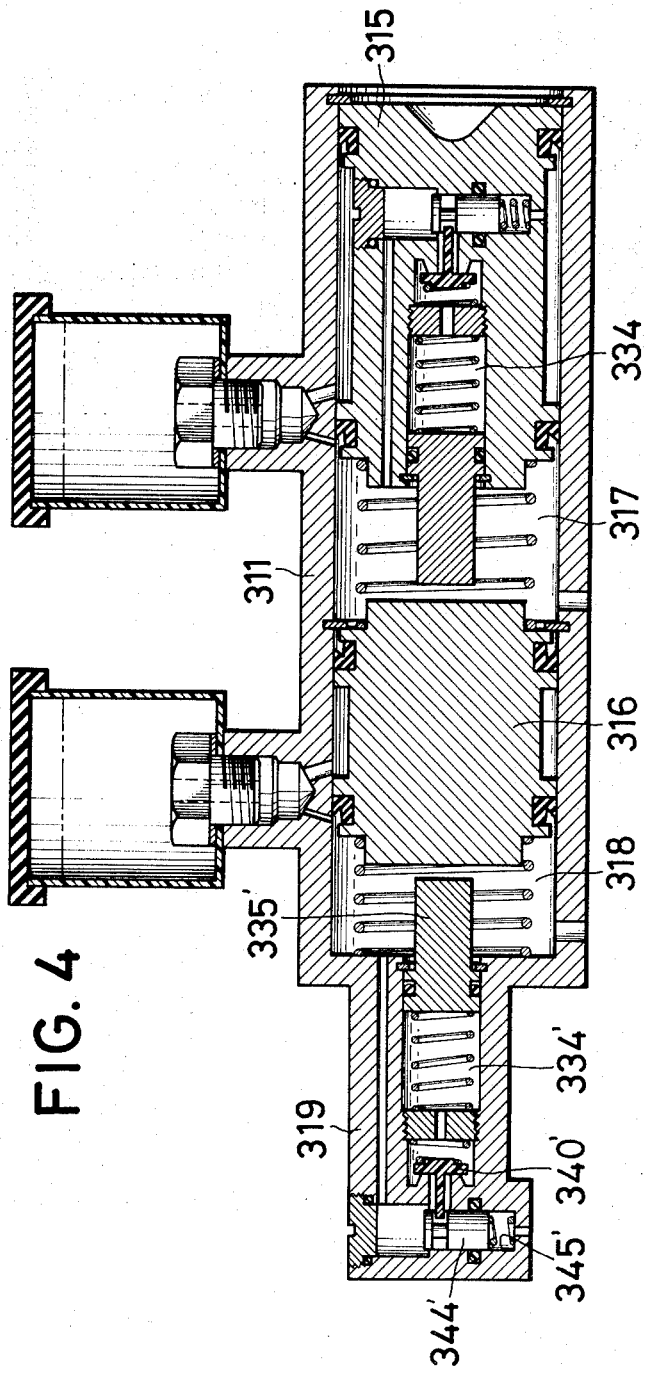
FIG. 4 is a view similar to FIG. 1 showing a third modification.

In FIG. 4 a third modification is shown in which there are provided a pair of fluid storage chambers 334 and 334' similar to the structure of FIG. 3. Only difference from the second modification resides in that one storage chamber 334' is formed in a forward end wall 319 of a cylinder housing 311 instead of a secondary piston 316. The cylinder end wall 319 further comprises a locking piston 335' slidingly and sealingly fitted in the storage chamber 334', a valve member 340' for controlling fluid communication between a secondary chamber 318 and the storage chamber 334', and a pilot piston 344' vertically movable in a bore 345' and engageable with the valve member 340'. As to the other storage chamber 334 and primary piston 315 and the like, they are of the same structure as in the first embodiment of FIG. 1, so the detailed description will be omitted.

When no brake pressure is generated in a primary chamber 317, the brake fluid in the storage chamber 334 will be locked as explained with reference to the first embodiment of FIG. 1. In the event of hydraulic failure of the brake system including the secondary chamber 318, the locking piston 335' is moved slightly to the left by the secondary piston 316 upon brake application. At this time, the pilot piston 344' is not moved to engage the valve member 340' so that the brake fluid in the storage chamber 334' will be locked by the locking piston 335' and the valve member 340'. Then, the locking piston 335' is no longer movable relative to the cylinder end wall 319 whereby the brake pedal travel loss can be minimized even though no fluid is being pressurized in the secondary chamber 318.

What is claimed is:

1. A tandem master cylinder comprising,
a cylinder housing having an end wall;
a primary piston movable by a brake pedal for pressurizing fluid in a primary chamber;
a secondary piston movable by a pressurized fluid in said primary chamber for pressurizing fluid in a secondary chamber;
locking piston means movably mounted in at least one of said primary and secondary pistons;
fluid storage means defined by said locking piston means and fluidically communicated with at least one of said primary and secondary chambers;
valve means for controlling fluid communication to said fluid storage means in response to changes of fluid pressure in at least one of said chambers associated with said fluid storage means;
whereby in the event of hydraulic failure of said one chamber associated with said fluid storage means fluid in said fluid storage means associated with said one chamber is locked by said locking piston means and valve means.

2. A tandem master cylinder comprising,
a cylinder housing having an end wall;
a primary piston movable by a brake pedal for pressurizing fluid in a primary chamber;
a secondary piston movable by a pressurized fluid in said primary chamber for pressurizing fluid in a secondary chamber;
a locking piston movably mounted in one of said primary and secondary pistons;
a fluid storage chamber defined by said locking piston and fluidically communicated with one of said primary and secondary chambers;
valve means for controlling fluid communication to said fluid storage chamber in response to changes of hydraulic pressure in said one chamber associated with said fluid storage chamber;
said locking piston being slidable in said fluid storage chamber by said one of said primary and secondary pistons opposite to said fluid storage chamber thereby locking the fluid in said fluid storage chamber in the event of hydraulic failure of said one chamber.

3. A tandem master cylinder as claimed in claim 2 wherein said valve means includes a valve member located in said fluid storage chamber and normally urged to interrupt said fluid communication and a pilot piston engageable with said valve member to permit said fluid communication when a hydraulic pressure in said one chamber reaches a predetermined value.

4. A tandem master cylinder as claimed in claim 3 wherein said pilot piston is movable in the radial direction of said one piston.

5. A tandem master cylinder as claimed in claim 3 wherein said valve means is mounted in said locking piston.

6. A tandem master cylinder as claimed in claim 5 wherein said pilot piston is movable in the axial direction of said locking piston.

7. A tandem master cylinder as claimed in claim 2 wherein a return spring is fitted in said fluid storage chamber for normally urging said locking piston to move in its forward direction.

8. A tandem master cylinder as claimed in claim 2 wherein said one chamber associated with said fluid storage chamber is fluidically connected to rear wheel brakes.

9. A tandem master cylinder comprising,
a cylinder housing having an end wall;
a primary piston movable by a brake pedal for pressurizing fluid in a primary chamber;
a secondary piston movable by a pressurized fluid in said primary chamber for pressurizing fluid in a secondary chamber;
a pair of fluid storage chambers fluidically communicated with said primary and secondary chambers, respectively;
a pair of valve means for controlling fluid communication to said fluid storage chambers, respectively, in response to changes of hydraulic pressure in each associated chamber;
a pair of locking pistons movably mounted in said fluid storage chambers, respectively;
whereby fluid in either one of said fluid storage chambers is locked in the event of hydraulic failure of said primary or secondary chamber associated with said one storage chamber.

10. A tandem master cylinder as claimed in claim 9 wherein one of said storage chambers is defined by said primary piston and one of said locking pistons slidingly sealingly fitted therein and the other storage chamber is defined by said secondary piston and the other locking piston slidingly sealingly fitted therein.

11. A tandem master cylinder as claimed in claim 9 wherein one of said fluid storage chambers is defined by said primary piston and one of said locking pistons slidingly sealingly fitted therein, and the other storage chamber is defined by said end wall of cylinder housing and locking piston slidingly sealingly fitted therein.

12. A tandem master cylinder as claimed in claim 9 wherein each valve means comprises a valve member located in each fluid storage chamber and normally urged to interrupt said fluid communication and a pilot piston engageable with said valve member to permit said fluid communication when a hydraulic pressure in each of said primary and secondary chambers reaches a predetermined value.

13. A tandem master cylinder as claimed in claim 12 wherein one of said valve means is located in said primary piston while the other valve means is located in said secondary piston.

14. A tandem master cylinder as claimed in 13 wherein each pilot piston is movable in the radial direction of each of said primary and secondary pistons.

15. A tandem master cylinder as claimed in claim 12 wherein one of said valve means is located in said primary piston while the other valve means is located in said end wall of cylinder housing.

16. A tandem master cylinder as claimed in claim 15 wherein one of said pilot pistons is movable in the radial direction of said primary piston while the other pilot piston is movable in the radial direction of said end wall of cylinder housing.

* * * * *